MEANS FOR EDITING SOUND RECORDINGS

Filed July 19, 1954

GLEN R. GLENN,
INVENTOR.

BY [signature]

ATTORNEY.

United States Patent Office 2,852,616

Patented Sept. 16, 1958

2,852,616

MEANS FOR EDITING SOUND RECORDINGS

Glen R. Glenn, Los Angeles, Calif.

Application July 19, 1954, Serial No. 444,045

6 Claims. (Cl. 179—100.1)

This invention relates to means and methods for editing sound recordings and more particularly to simultaneously producing an invisible, impermanent magnetic sound recording on a strip of material and a visible intelligible permanent impression or marking adjacent to said invisible sound recording and which is a counterpart of the magnetic recording so as to facilitate editing of the recorded sound.

Editing of sound for motion picture film presents problems of synchronization and matching of the sound recording with the scene taken by the motion picture film. It is customary practice to make a separate sound recording when taking a scene for motion picture reproductions. The separate sound recording is preferably a magnetic recording which is invisible, impermanent and made on a recording zone provided on a strip of material. Magnetic sound recordings are preferably employed because of the improved and greater range of frequency and amplitude reproduction. Editing of motion picture film requires editing of sound recordings and since the magnetic recording is invisible, it is difficult to determine with accuracy precise sections of the invisible magnetic recording to be deleted in order that the sound recording will conform to and be synchronized with the edited motion picture film. As a result, even though great care and skill are used when editing sound film, desired portions of conversation or sound may be unknowingly deleted from the invisible magnetic sound recording.

This invention contemplates a method of editing invisible sound recordings such as a magnetic sound recording whereby the exact point for cutting the magnetic recording is conveniently, accurately and readily determined. The invention contemplates a strip of flexible material provided with a sound recording zone upon which sound may be magnetically recorded. Adjacent to the sound recording zone and likewise carried by the strip of material, is provided a band or coating upon which may be physically and intelligibly impressed, a visual, permanent representation of sound recorded in juxtapositioned portions of the magnetic sound recording zone. Observation and examination of the visible, understandable representation of the sound recorded on the invisible, magnetic sound recording zone facilitates the exact cutting of the sound recording during editing because the beginning or end of speech or the significant aspects of the sound recording can be readily determined.

The invention contemplates an apparatus and method for producing an easily edited sound recording employing strip material as mentioned above wherein a rotatable drum, having a cylindrical, smooth surface is provided for supporting strip material which is advanced thereover by well-known means. Positioned adjacent to the drum and mounted for pivotal movement into proximity therewith, is a recording means comprising an arm pivoted at one end to the frame of the apparatus. The arm supports in laterally spaced relation, a magnetic recording head and a reciprocally movable stylus, the head and stylus being respectively aligned with the magnetic recording zone and an adjacent visible, physical recording zone on the strip material. The magnetic recording head and the stylus are made simultaneously responsive to sound to be recorded so that there is simultaneously produced an invisible, impermanent sound recording on the magnetic recording zone and a visible, intelligible, impermanent, understandable sound recording of significant aspects of amplitude and frequency on the visible recording zone. The visible recording may be of the type disclosed in the Miller Patent No. 1,919,116 wherein a hill and dale groove of variable width is impressed in a recording zone. It is understood, however, that other visible means for recording sound may be employed in place of the recording stylus of the Miller patent.

The primary object of this invention is to provide a novel means and method for editing an invisible, impermanent sound recording.

An object of this invention is to design and provide a means and method for editing an invisible sound recording provided on a strip of material wherein a visible, intelligible representation of the sound recording is provided adjacent to the invisible sound recording.

Another object of this invention is to provide a method for facilitating editing of invisible, magnetic sound recordings wherein significant aspects of amplitude and frequency of the sound invisibly recorded is understandably and intelligibly impressed upon a zone lying adjacent to the invisible sound recording.

A further object of this invention is to design and provide a strip of material which is adapted to be used in the method of editing sound recordings of this invention wherein a longitudinally extending magnetic recording zone lies parallel to an adjacent longitudinally extending portion of the strip material which is adapted to be marked or impressed by understandable, visible representations of the sound invisibly recorded in the magnetic recording zone.

A still further object of this invention is to design and provide an apparatus which is capable of simultaneously recording on a strip of material as described above, a magnetic sound recording and a visible, intelligible representation of the sound recorded.

Still another object of this invention is to design and provide an apparatus capable of employing the method of this invention and the strip of material as described wherein means are provided for limiting the depth of the visible impressions of sound made upon the portion of the strip material adjacent to the magnetic sound recording zone.

Other objects and advantages of this invention will be readily apparent from the following description of the drawings.

Figure 1:
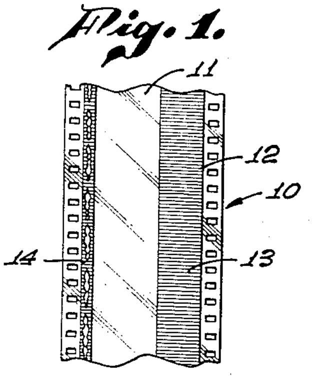
Fig. 1 is a fragmentary plan view of a strip of material employed with the method of this invention.
Figure 2:
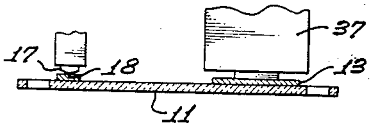
Fig. 2 is an enlarged sectional view of the strip of material shown in Fig. 1 and showing recording means in cooperable engagement with recording zones.
Figure 3:
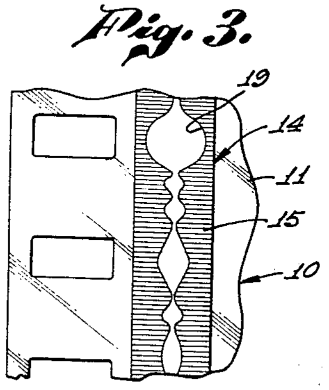
Fig. 3 is an enlarged fragmentary plan view of a band or coating upon which a visual impression is made of the sound recorded.

Referring first to the strip of material generally indicated at 10 shown in Figs. 1–3 inclusive, it will be noted that said strip 10 may be formed in well-known manner by a base 11 of celluloid or other suitable strip material. The base 11 may be transparent, flexible and provided with spaced perforations along side margins of the strip for cooperable driving engagement with sprocket wheels in well-known manner. The strip of material may comprise, for example, an exposed motion picture film strip.

The strip of material 10 is provided with a magnetic recording zone 12 formed by a longitudinally extending band or coating 13 disposed slightly inwardly of the perforations along one edge margin of said strip. The coating is formed on one surface of the base 11 and may comprise any suitable magnetic oxide adapted to magnetically record sound and providing an invisible impermanent sound recording.

A visual recording zone 14 may be provided by a longitudinally extending coating 15 formed on the same surface of base 11 as the magnetic coating 13. The coating 15 extends parallel to the magnetic recording zone and may be disposed adjacent to the other edge margin of the strip of material. The coating 15 may be made of any suitable opaque material such as gelatin and may be softer than the celluloid base 11.

It may be noted that the portion of the strip of material lying between the magnetic recording zone 12 and the visual recording zone 15 may be transparent in order to facilitate editing of the sound recording by observation therethrough of a strip of motion picture film being edited. It is understood that the visual recording zone 14 may lie in adjacent non-spaced relation to the magnetic recording if so desired.

The visual recording zone is adapted to provide understandable visible representations of the sound recorded on adjacent opposed portion of the magnetic recording zone. Preferably, the visual sound recording is made by a stylus 17 of the type disclosed in the Millet Patent No. 1,919,116 whereby a hill-and-dale impression is made in coating 15 by vertical movement of stylus 17 in response to the sound to be recorded. The stylus 17 has a cutting edge 18 defining a relatively large angle of approximately 174° whereby slight vertical movement of the stylus is indicated by a relatively wide laterally extending envelope-type impression 19 in the coating 15. The impression 19 may be readily observed and is intelligible so as to easily determine significant aspects of frequency and amplitude of the sound recorded. Thus, a visible permanent record is provided of the sound recorded, and such visible record is in predetermined, selected relationship with the corresponding counterpart of the sound invisibly recorded on the magnetic recording zone.

Figure 4:
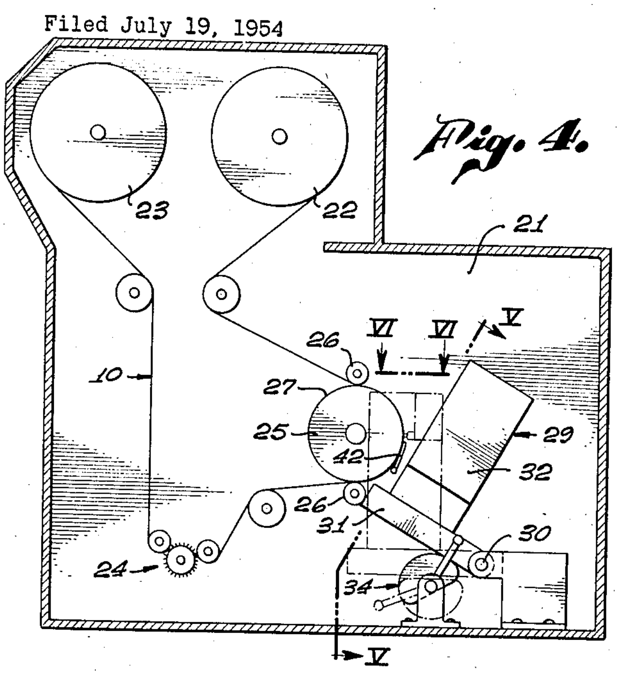
Fig. 4 is a diagrammatic elevational view of an apparatus embodying this invention and employing strip material as shown in Fig. 1.
Figure 5:
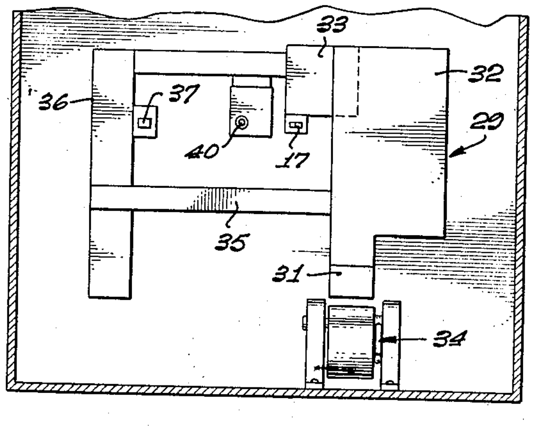
Fig. 5 is a fragmentary diagrammatic view taken in the inclined plane indicated by line V—V of Fig. 4.
Figure 6:
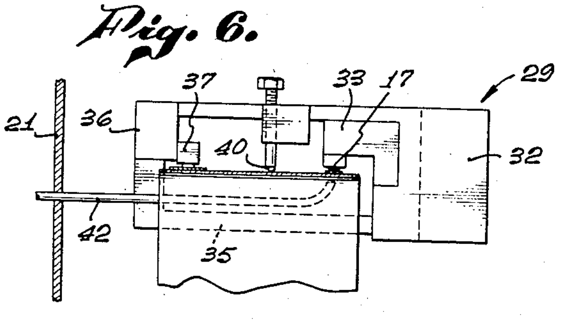
Fig. 6 is a fragmentary enlarged view taken from the plane indicated by line VI—VI of Fig. 4 with the recording means in cooperable relation to the strip of material.

Apparatus for employing the strip of material 10 described above and for making simultaneously a sound recording which has a visible and invisible counterpart is diagrammatically shown in Figs. 4–6 inclusive. The apparatus may include a suitable frame structure provided by a vertically disposed mounting plate 21 upon which film winding and unwinding reels 22 and 23, respectively, may be mounted. The path of an exemplary strip of material 10 carried by said reels may be determined by a suitable well-known system of drive sprocket wheels and guide wheels generally indicated at 24. The path of the strip of material 10 includes passage of said strip over a rotatable cylindrical drum 25 carried by plate 21. Top and bottom guide wheels 26 are provided for causing strip 10 to lie smoothly in contact with a portion of the cylindrical surface 27 of the drum as the strip is advanced.

Recording means generally indicated at 29 are pivotally mounted from mounting plate 21 for movement about a horizontal pivotal axis 30. The recording means is movable from a position spaced from said drum 25 to a position into close proximity with said drum 25 whereby the recording means will be disposed in cooperable relation with the portion of strip 10 supported by and passing over the cylindrical surface 27.

A suitable cam and lever means 34 is provided at the bottom of arm 31 for moving the recording means 29 into and out of cooperable relation to the strip of material 10.

The recording means 29 includes an arm 31 adapted to carry a permanent magnet within a housing 32. The arm 31 carries on the side opposite housing 32 a removable member 33 which carries a suitable well-known coil and armature system which is electrically responsive to sound to be recorded. The member 33 carries the stylus 17 which is associated with the armature for movement responsive to sound to be recorded.

A laterally extending bar 35 is supported by arm 31 and carries adjacent its outer end a member 36 extending parallel to and spaced from arm 31. The member 36 carries on its inner face a magnetic recording head 37. The recording head 37 is laterally spaced from stylus 17 and may lie transversely directly opposite to said stylus. The recording head 37 and the stylus 17 are connected by well-known electrical means to a sound transmitting device so that recording head 37 and stylus 17 will simultaneously record sound in their respective recording zones on the strip of material 10.

As best seen in Fig. 6, the recording head 37 and stylus 17 are aligned with their respective magnetic and visual recording zones 12 and 14. Thus, while the magnetic recording head is making an invisible impermanent sound recording on the magnetic recording zone, the stylus 17 is simultaneously impressing or marking on the opaque coating 15 a visible record of the sound being recorded.

Means for limiting the depth of impression to be made by stylus 17 is provided by a freely rotatable ball 40 carried by recording means 29 between stylus 17 and the recording head 37. The ball 40 is adapted to contact the strip of material and is adjustable to prevent stylus 17 from cutting through the celluloid base 11 beneath coating 15. Thus, the ball 40 serves to prevent jamming of the stylus 17 into the strip of material and limits the cutting of the stylus into the base 11.

The recording means 29 and its pivotal mounting about axis 30 is such that when in cooperable relation with the portion of the strip of material supported by the cylindrical surface 27, the recording head 37 and stylus 17 will virtually float or lightly contact the strip of material 10. Preferably the recording means 29 may be made of a relatively heavy metal counterbalanced by suitable spring means when in cooperable relation with the strip of material for recording.

A suction tube 42 may be carried by plate 21 with its open end positioned in proximity to the point of contact of stylus 17 with the coating 15. Cuttings from the coating 15 made by oscillations of the stylus in response to sound being recorded are sucked and drawn into the tube 42.

In operation, sound to be recorded is transmitted to the magnetic recording head 37 and the stylus 17 by means of well known electrical apparatus and circuits. As the sound is recorded on the magnetic recording zone by the proximity of the recording head 37 to the magnetic oxide carried in said zone, the stylus 17 simultaneously impresses or marks a visible, intelligible record of the sound to be recorded on the band 15 of opaque gelatin material. Thus, when it is desired to edit motion picture film prints and the sound to accompany the edited film, the exact place for cutting the magnetic sound recording will be readily apparent because of the juxtapositioned visibly understandable intelligible sound recording on the visual recording zone.

It is understood that other means may be employed for visibly marking the visual recording zone in an intelligible understandable manner. The visible marking need not be made directly opposite to the magnetically recorded counterpart, and may be spaced a selected predetermined longitudinal distance therefrom. Likewise, the lateral spacing of the visual and magnetic recording zones may be varied.

All changes and modifications of the strip of material, method, and apparatus described above and coming within the scope of the appended claims are embraced thereby.

I claim:

1. In an apparatus for producing an invisible impermanent magnetic sound recording and a visible permanent counterpart of said sound recording in adjacent relationship thereto and upon a strip of material, the combination of: means to advance a strip of material having a longitudinally extending recording zone; a cylinder means providing a curved surface for supporting said strip in a predetermined path of travel; sound recording means pivotally mounted for movement into cooperative sound recording relationship with said strip in said curved path of travel, said sound recording means including a housing at one side of said path of travel of the strip; a marking means carried by the housing aligned with an adjacent portion of the strip for marking a visible intelligible permanent sound recording thereon; an arm extending across the path of travel of the strip; a recording head carried by said arm and aligned with the recording zone for making the invisible sound recording; and means connected to the recording head and marking means for simultaneous response thereof to sound to be recorded.

2. Apparatus as stated in claim 1 including cam means at the pivotal mounting of the sound recording means to position said recording means into an out-of-recording position.

3. An apparatus as stated in claim 2 including means positioned between the recording head and the marking means to adjust the marking means relative to the strip to limit the depth of impression therein.

4. An apparatus as stated in claim 3 wherein said depth limiting means includes a ball element adapted to contact said strip material.

5. An apparatus as stated in claim 2 wherein said marking means includes a stylus and suction means are positioned adjacent said stylus to remove cuttings from the path of travel of said strip.

6. In an apparatus for producing an invisible impermanent magnetic sound recording and a visible, permanent counterpart of said sound recording in adjacent relationship thereto, and upon a strip of material, the combination of: means to advance a strip of material having a longitudinally extending recording zone; means providing a surface for supporting said strip in a predetermined path of travel; sound recording means including a housing pivotally mounted in vertical spaced relation to said support surface for movement into cooperative sound recording relationship with said strip, a marking means on the housing aligned with an adjacent portion of the strip for marking a visible, intelligible, permanent sound recording thereon; means on said housing extending across the path of travel of the strip, a recording head carried by said last-mentioned means on said housing and aligned with the recording zone for making the invisible sound recording; and means connected to the recording head and marking means for simultaneous response thereof to sound to be recorded.

References Cited in the file of this patent

UNITED STATES PATENTS

| | | |
|---|---|---|
| 1,591,081 | Curtis | July 6, 1926 |
| 2,632,815 | Crespinel | Mar. 24, 1953 |
| 2,637,785 | Charlin | May 5, 1953 |
| 2,677,728 | Kolb et al. | May 4, 1954 |